(No Model.)
L. CONKLIN.
HUB FOR VEHICLE WHEELS.
No. 362,493. Patented May 10, 1887.
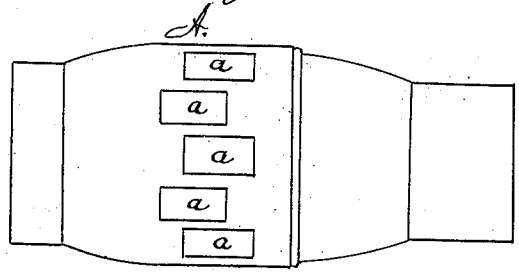
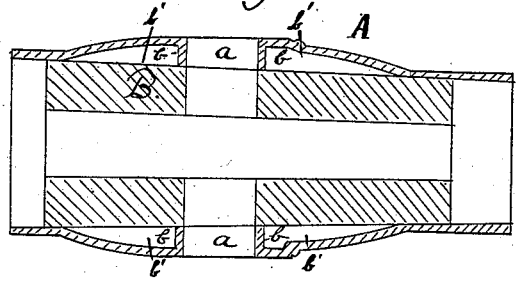
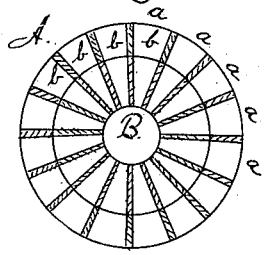
Witnesses
Wm. C. Case
Auther E. Geer
Inventor:
Lester Conklin
By His attorney
Andrew O'Neill

UNITED STATES PATENT OFFICE.

LESTER CONKLIN, OF WALLINGFORD, CONNECTICUT.

HUB FOR VEHICLE-WHEELS.

SPECIFICATION forming part of Letters Patent No. 362,493, dated May 10, 1887.

Application filed September 26, 1885. Serial No. 178,240. (No model.)

*To all whom it may concern:*

Be it known that I, LESTER CONKLIN, a citizen of the United States, residing at Wallingford, in the county of New Haven and State of Connecticut, have invented certain new and useful Improvements in Hubs for Vehicle-Wheels; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

Figure 1 represents a side view, Fig. 2 a longitudinal section, and Fig. 3 a cross-section.

This invention relates to an improvement in carriage-hubs, the object being to construct a hub that will be stronger and more durable than hubs now in use for carriages and like vehicles; and the invention consists in constructing a hub partly from iron and wood, as more fully hereinafter described, and more particularly specified in the claim.

The body of the hub A is made from cast metal in any desirable shape. Around its circumference mortises $a$ are cast in the hub, with inwardly-projecting flanges $b$, to make a bearing for the insertion of the spokes. A wooden plug or lining, B, is made to fit tightly within the shell or hub A, and mortised to correspond to the mortises in said part A. The plug or lining B is bored out to make a seat for the axle-box, as in ordinary hubs. The insertion of the spokes in the mortises firmly unites the wooden lining to the metal part A. Spaces $b'$ are left between the hub-body B and shell A at the outer sides of flanges $b$. The hub as thus constructed makes a light and durable article for the purpose, strong in its construction, and not liable to crack and become unserviceable, as ordinary wooden hubs.

The flanges $b$ are in a plane at right angles to the axis of the hub. They do not enter the wooden body B, but are merely in contact with the exterior thereof.

Having fully described my invention, what I claim as new, and desire to secure by Letters Patent, is—

A hub consisting of a wooden body and an external shell, the latter having mortises $a$ and flanges $b$, said flanges being at right angles to the axis of the hub and extending inwardly to said wooden body thereof without entering it, an open space being left on the outer sides of said flanges, substantially as shown.

In testimony whereof I affix my signature in presence of two witnesses.

LESTER CONKLIN.

Witnesses:
 WM. C. CASE,
 ARTHUR E. GEER.